(No Model.)

M. T. WILLIAMS.
SEWER GAS TRAP.

No. 268,584. Patented Dec. 5, 1882.

WITNESSES:
Chas. Nida
C. Sedgwick

INVENTOR:
M. T. Williams
BY Munn & Co.
ATTORNEYS.

UNITED STATES PATENT OFFICE.

MOSES T. WILLIAMS, OF RIVERSIDE, CONNECTICUT.

SEWER-GAS TRAP.

SPECIFICATION forming part of Letters Patent No. 268,584, dated December 5, 1882.

Application filed September 7, 1882. (No model.)

*To all whom it may concern:*

Be it known that I, MOSES T. WILLIAMS, of Riverside, in the county of Fairfield and State of Connecticut, have invented a new and useful Improvement in Sewer-Gas Traps, of which the following is a full, clear, and exact description.

Reference is to be had to the accompanying drawings, forming a part of this specification, in which similar letters of reference indicate corresponding parts in both the figures.

Figure 1:
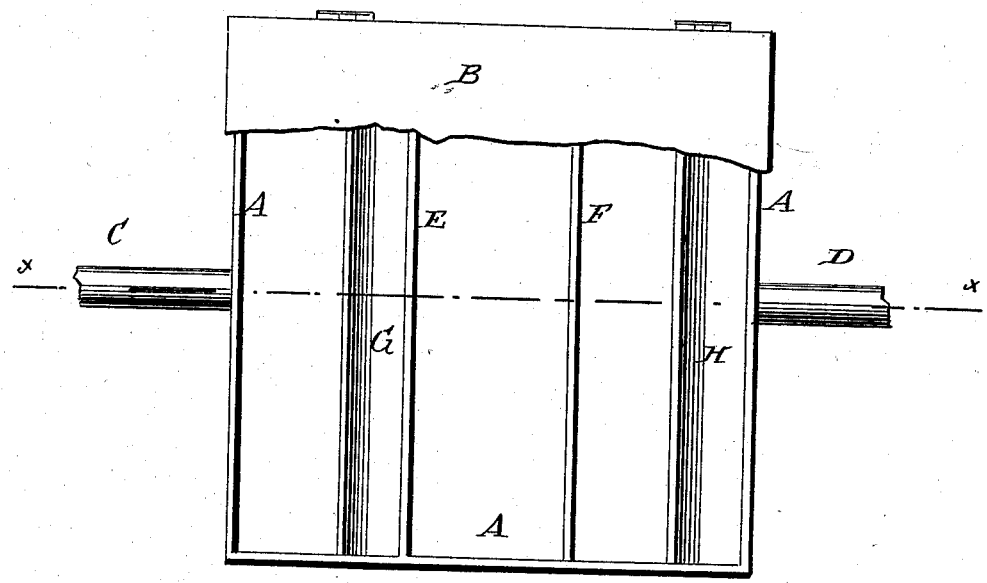
Figure 2:
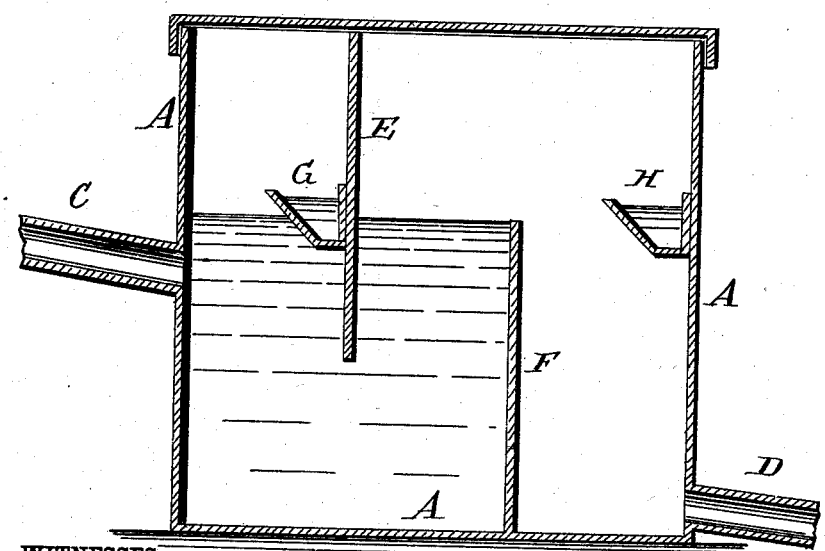

Figure 1 is a plan view of my improvement, part of the cover being broken away. Fig. 2 is a sectional side elevation of the same, taken through the line $x\,x$, Fig. 1.

The object of this invention is to guard against sewer-gas entering a building through the sewer-pipe connections.

The invention consists in a sewer-gas trap constructed with a separable cover provided with inlet and outlet pipes divided into three compartments by upper and lower partitions, and provided with disinfectant-vessels within the first and third compartments, whereby sewer-gas passing through or generated in the trap will be prevented from entering the building, as will be hereinafter fully described.

A represents the body of the trap, which is made of rectangular or other suitable form, and of any convenient size, reference being had to the amount of sewage liable to pass through the trap. The body A is provided with a cover, B, which is hung at one side to the said body A, so that it can be conveniently opened, and is fitted air-tight to the said body A. With an opening in the middle or upper part of one side of the trap A is connected the inlet-pipe C, and with an opening in the lower part of the opposite side is connected the outlet-pipe D. The interior of the trap A is divided into three nearly equal compartments by two partitions, E F. The partition E extends from the top of the trap A about two-thirds of the distance to its bottom, and the partition F extends from the bottom of the trap about two-thirds of the distance to its top, as shown in Fig. 2. With this construction the first and second compartments of the trap will be always full to the level of the upper edge of the partition F, and all the sewage that enters the trap must pass beneath the lower edge of the partition E and over the upper edge of the partition F into the third compartment of the trap, whence it flows out through the outlet-pipe D.

To the partition E within the first compartment of the trap is secured a trough or open vessel, G, to receive a suitable disinfectant, the said trough being placed at such an elevation that its mouth will always be above the water-level of the trap.

To the outlet side of the trap A is secured a trough or open vessel, H, in such a position that its mouth will always be above the water-level of the trap, and which is also designed to receive a disinfectant.

In using my improved trap I place green vitriol, carbolic acid, girondine, Platt's chlorides, or a mixture of two or more of these disinfectants, or any other suitable disinfectant, in the troughs G H, the removable cover B allowing this to be done conveniently.

With this construction any sewer-gas that may enter the trap will be destroyed by the disinfectant in the trough H, and any sewer-gas that may pass through the liquid in the first and second compartments, or that may be generated in the said liquid, will be destroyed by the disinfectant in the trough G, so that no sewer-gas will pass through or from the trap into the building.

Two or more disinfectant-vessels can be placed in each compartment of the trap, if desired.

I am aware that it is not new to divide a trap into compartments by one partition extending down from the inlet-pipe nearly to the bottom of trap and by another extending up from the outlet-pipe nearly to the top or dome of the trap; but

What I claim as new and of my invention is—

In a sewer-gas trap, the combination, with the trap A, provided with a separable cover, B, and divided into three compartments by the upper and lower partitions, E F, of disinfectant-vessels G H, substantially as herein shown and described, whereby sewer-gas passing through or generated in the trap will be prevented from entering the buildings, as set forth.

MOSES T. WILLIAMS.

Witnesses:
JAMES T. GRAHAM,
C. SEDGWICK.